United States Patent [19]

Nakamura

[11] Patent Number: 5,687,394
[45] Date of Patent: Nov. 11, 1997

[54] AUXILIARY STORAGE APPARATUS CAPABLE OF TRANSFERRING BOOTSTRAP PROGRAMS USING VARIABLE ACCESS SIZES

[75] Inventor: Masanobu Nakamura, Kanagawa, Japan

[73] Assignee: Sony Corporation, Tokyo, Japan

[21] Appl. No.: 677,244

[22] Filed: Jul. 9, 1996

Related U.S. Application Data

[63] Continuation of Ser. No. 341,430, Nov. 17, 1994, abandoned.

[30] Foreign Application Priority Data

Nov. 19, 1993 [JP] Japan .................................. 5-291029

[51] Int. Cl.$^6$ ........................................................ G06F 9/06
[52] U.S. Cl. ............... 395/853; 395/497.02; 395/497.01; 395/652; 395/497.04; 395/441; 369/58; 369/275.1
[58] Field of Search ........................ 395/700, 828, 395/830, 200, 275, 404, 500, 425, 497.02, 497.01, 652, 497.03, 497.04, 441, 853, 712

[56] References Cited

U.S. PATENT DOCUMENTS

| | | | |
|---|---|---|---|
| 4,117,974 | 10/1978 | Ciaramella | 235/404 |
| 4,663,707 | 5/1987 | Dawson | 364/200 |
| 5,086,502 | 2/1992 | Malcolm | 395/575 |
| 5,119,291 | 6/1992 | Flannagan et al. | 395/275 |
| 5,179,662 | 1/1993 | Corrigan et al. | 395/200 |
| 5,226,168 | 7/1993 | Kobayashi et al. | 395/800 |
| 5,237,689 | 8/1993 | Behnke | 395/700 |
| 5,263,168 | 11/1993 | Toms et al. | 395/700 |
| 5,313,617 | 5/1994 | Nakano et al. | 395/500 |
| 5,359,623 | 10/1994 | Nakamura | 369/32 |
| 5,379,382 | 1/1995 | Work et al. | 395/275 |
| 5,418,918 | 5/1995 | Vander Kamp et al. | 395/275 |
| 5,420,998 | 5/1995 | Horning | 395/425 |
| 5,446,869 | 8/1995 | Padgett et al. | 395/500 |
| 5,471,604 | 11/1995 | Hasbun et al. | 395/404 |
| 5,473,775 | 12/1995 | Sakai et al. | 395/700 |
| 5,485,439 | 1/1996 | Hamasaka et al. | 369/47 |
| 5,594,903 | 1/1997 | Bunnell et al. | 395/712 |

*Primary Examiner*—Christopher B. Shin
*Attorney, Agent, or Firm*—Limbach & Limbach L.L.P.

[57] ABSTRACT

An auxiliary storage apparatus connected through an interface means to a computer to access data from a storage medium includes access means for accessing the storage medium at the unit of predetermined data amount, a memory disposed between the interface means and the access means for temporarily accumulating data transmitted between the interface means and the access means, and a control means for reading access size information recorded on a particular area of the storage medium by the access means and setting access size of transmitting and receiving data between the memory and the computer on the basis of access size information thus read out.

12 Claims, 12 Drawing Sheets

AUXILIARY STORAGE APPARATUS CAPABLE OF TRANSFERRING BOOTSTRAP PROGRAMS USING VARIABLE ACCESS SIZES

This is a continuation of application Ser. No. 08/341,430 filed on Nov. 17, 1994, abandoned.

BACKGROUND OF THE INVENTION

The present invention relates to an auxiliary storage apparatus connected to a computer through an interface bus as an auxiliary memory for the computer.

Computers carry out various data processings and control by using a CPU (central processing unit) to read and execute program instructions stored in a main storage apparatus through a storage control device.

A program instruction is one unit (step) of a program (algorithm) to process data and composed of program instruction having a number of steps.

If the computer is of such a type as to execute simple processing, then a small-scale program with less program instruction is registered in advance in some suitable means, such as a ROM (read-only memory) or the like mounted within the computer. Conversely, if large amounts of data are processed and controlled by one computer, then it is necessary to provide another storage or memory means to supplement the main storage apparatus in order to store large amounts of programs and data having a large-scale data size.

Auxiliary storage apparatus, such as a hard disk using a magnetic disc and a bulk storage using a semiconductor memory, are known. The auxiliary storage apparatus can store large amounts of program and data when it is connected to the computer through an interface bus. Program and data stored in the auxiliary storage apparatus are read out to the main storage apparatus in accordance with selective activation and read request from a proper OS (operating system) or application program and used to process and control large amounts of data.

The ROM mounted within the computer has program of a relatively small size registered therein to effect computer system check, memory check, setup and to read a bootstrap program. A Bootstrap program is generally stored in the auxiliary storage apparatus together with the operating system (OS).

A series of processing steps executed when the computer is energized, i.e., when the operating system (OS) is activated, will be described below briefly.

Initially, when the computer is energized, system check, memory check and setup are carried out, whereafter a program for reading a bootstrap program is read out from a ROM or the like to the main storage apparatus and then executed.

After this program is executed, a bootstrap program is read out to the main storage apparatus incorporated within the computer from the auxiliary storage apparatus and the bootstrap program is executed.

When the bootstrap program is executed, the bootstrap program functions to read the operating system (OS) activation program from the auxiliary storage apparatus to the main storage apparatus and to execute the operating system (OS) activation program.

When the operating system (OS) activation program is executed, the operating system (OS) activation program functions to selectively read out the operating system (OS) from the auxiliary storage apparatus in accordance with operating system (OS) transfer information stored in the main storage apparatus. Then, the CPU controls a particular address of the operating system (OS) thus read out and executes the operating system (OS), the operating system (OS) thereby being activated. Then, when the operator issues a selective command request or activates the application program by input means (keyboard or the like), processing of various data and control are carried out by the computer.

The auxiliary storage apparatus has different access units depending on the kinds of storage media. Therefore, it is frequently observed that the access unit is different from the sector size allowed by the computer to read the bootstrap program, i.e., bootstrap sector size.

Particularly, when a magneto-optical disc (e.g., magneto-optical disc with a diameter of 64 mm) is used as a storage medium, an access size for accessing the magneto-optical disc once is 2048 bytes but a bootstrap sector size allowed by the computer is 512 bytes, for example.

Specifically, when the bootstrap program transfer request is issued from the computer, and the bootstrap program is transferred to the computer to the magneto-optical disc at the access size (e.g., 2048 bytes) 2048-byte data including the bootstrap program is written in the system region of the main storage apparatus. This may disadvantageously cause various data and program concerning system stored previously in the system region to be destroyed.

On the other hand, when a bootstrap program larger than the predetermined bootstrap size is transferred, the CPU may inhibit a bootstrap program larger than the predetermined bootstrap size from being stored in the main storage. If this is the case the operating system (OS) cannot be activated.

SUMMARY OF THE INVENTION

In view of the aforementioned problems, it is an object of the present invention to provide an auxiliary storage apparatus in which an operating system can be normally activated even when the access size used by the auxiliary storage apparatus for accessing the storage medium and a bootstrap sector size allowed by a computer are different.

According to a first aspect of the present invention, an auxiliary storage apparatus is connected through interface means to a computer to access data from a storage medium. The auxiliary storage apparatus includes access means for accessing the storage medium at the unit of predetermined data amount, a memory disposed between the interface means and the access means for temporarily accumulating data transmitted between the interface means and the access means, and a control means for reading access size information recorded on a particular area of the storage medium by the access means and setting access size of transmission and reception of data between the memory and the computer on the basis of access size information thus read out.

According to a second aspect of the present invention, there is provided a method of transferring data between a computer and an auxiliary storage apparatus connected to each other through interface means, the auxiliary storage apparatus for accessing data from a storage medium at the unit of a predetermined data amount. The data transfer method comprises the steps of reading access size information recorded on a particular area of the storage medium by the auxiliary storage apparatus, setting an access size of transmission and reception of data between the computer and the auxiliary storage apparatus on the basis of access information thus read out, and transmitting and receiving data between the computer and the auxiliary storage apparatus at the set access size.

In accordance with a third aspect of the present invention, there is provided a computer system having a computer and an auxiliary storage apparatus connected through interface means to the computer for accessing data from a storage medium. The auxiliary storage apparatus comprises access means for accessing the storage medium at the unit of predetermined data amount, a memory disposed between the interface means and the access means for temporarily accumulating data transmitted between the interface means and the access means, and a control means for reading access size information recorded on a particular area of the storage medium by the access means and setting access size of transmitting and receiving data between the memory and the computer on the basis of access size information thus read out.

BRIEF DESCRIPTION OF THE DRAWINGS

FIGS. 2A through 2C are cross-sectional views showing right-hand half portions of three kinds of optical discs used as storage media of the inventive auxiliary storage apparatus; wherein FIG. 2A shows a read-only optical disc;

FIG. 2B shows a recordable optical disc; and

FIG. 2C shows a hybrid type optical disc;

DETAILED DESCRIPTION OF THE PREFERRED EMBODIMENT

An auxiliary storage apparatus according to an embodiment of the present invention will hereinafter be described with reference to FIGS. 1 to 12.

Figure 1:
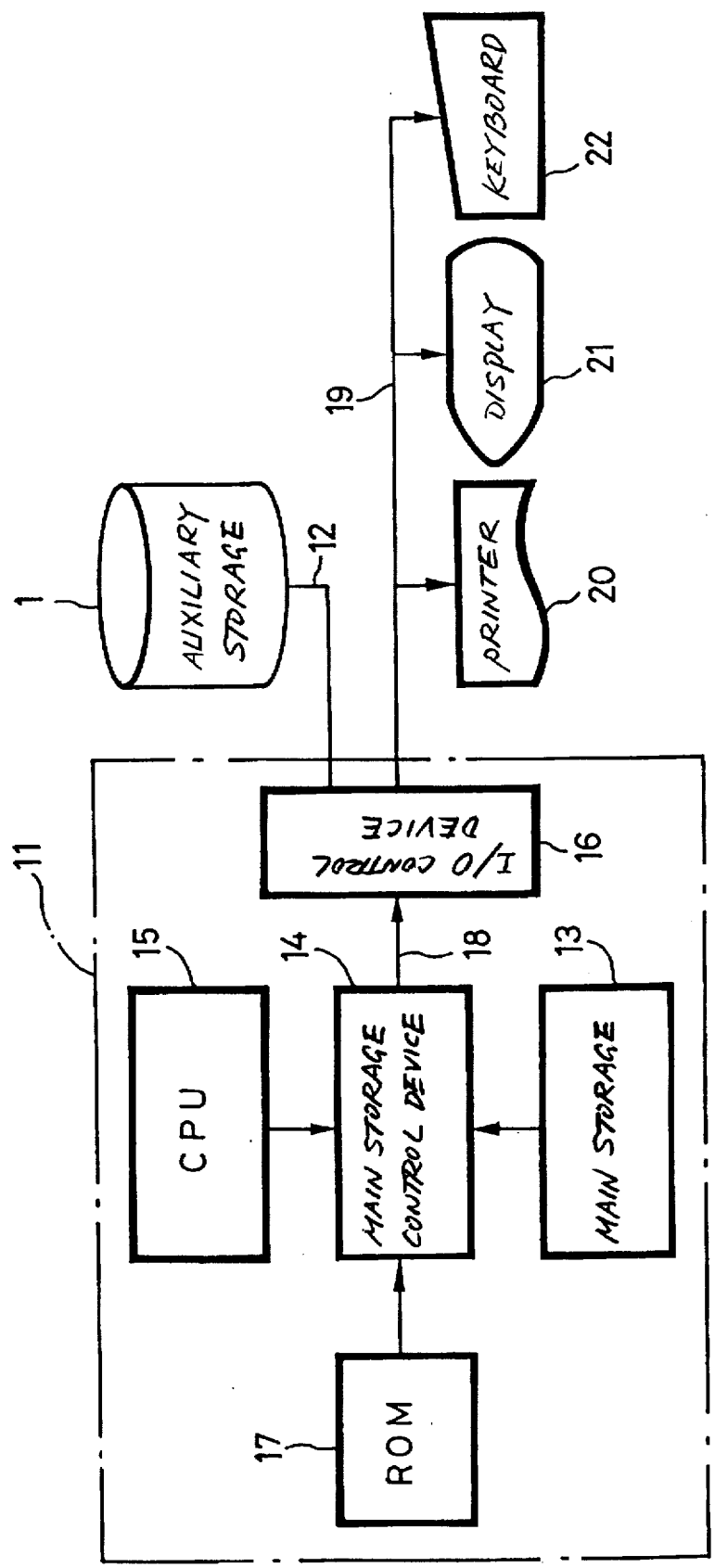
FIG. 1 is a block diagram showing a computer system to which an auxiliary storage apparatus according to an embodiment of the present invention is applied.

As shown in FIG. 1 of the accompanying drawings, an auxiliary storage apparatus 1 according to this embodiment comprises a loading mechanism (not shown) in and/or from which a disc cartridge in which a 64-mm optical disc is rotatably accommodated is loaded and/or unloaded, a rotation drive mechanism (not shown) for rotating the optical disc accommodated within the disc cartridge at a CAV (constant angular velocity) or a CLV (constant linear velocity), a recording and/or reproducing head (not shown) for recording and/or reproducing an information signal in and/or from the optical disc, an actuator (not shown) for properly positioning the recording and/or reproducing head at a certain position on the optical disc, a servo control circuit (not shown) for servo-controlling the recording and/or reproducing head, the actuator or the like, and a system controller (not shown) for controlling various circuits and mechanisms.

Figure 2A:
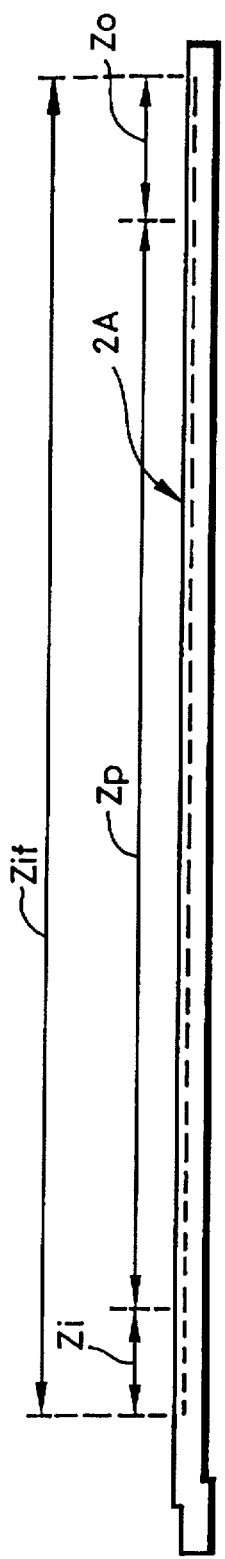
Figure 2B:
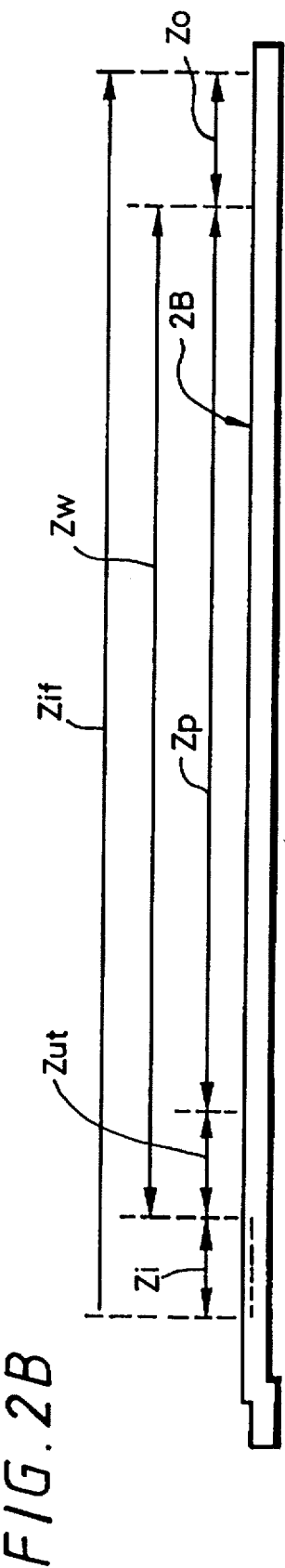

As the optical disc, there are now commericially available a read-only optical disc 2A which comprises a leadin area Zi provided at the innermost periphery of an information area Zif, a leadout area Zo provided at the outermost periphery of the information area Zif and a program area Zp formed by pre-pits (pit information provided by concavities and convexities) between the leadin area Zi and the leadout area Zo, as shown in FIG. 2A; an optical disc 2B formed of a recordable magneto-optical disc which comprises a leadin area Zi provided at the innermost periphery of an information area Zif, a leadout area Zo provided at the outermost periphery of the information area Zif and a recordable area Zw formed between the leadin area Zi and the leadout area Zo by a magneto-optical recording layer as shown in FIG. 2B; and a hybrid optical disc 2C which comprises a leadin area Zi provided at the innermost periphery of the information area Zif, a leadout area Zo provided at the outermost periphery of the information area Zif, a first program area Zp1 formed by pre-pits (pit information provided by concavities and convexities) and a recordable area Zw formed of the magneto-optical recording layer, both of which are formed between the leadin area Zi and the leadout area Zo.

On the leadin area Zi of each optical disc is recorded data indicating attribute (disc type, track information, etc.) of each optical disc, i.e., TOC (table of contents) data based on pit information provided by concavities and convexities.

In the recordable optical disc 2B shown in FIG. 2B, the inner peripheral area (area adjoining the leadin area Zi) of the recordable area includes a TOC data area in which the user can freely record data indicating disc attribute, i.e., UTOC (user table of contents) area Zut and other areas forming a program area Zp.

Figure 2C:
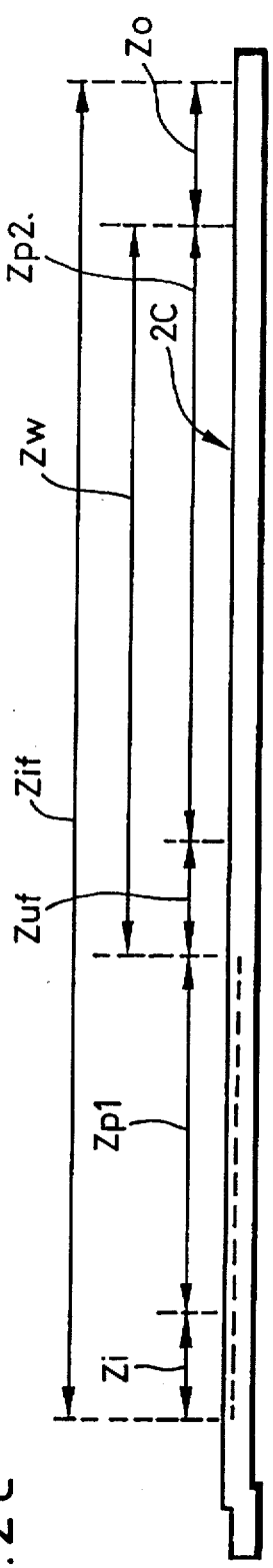

In the hybrid optical disc 2C shown in FIG. 2C, the inner peripheral area (area adjoining the first program area Zp1) of the recordable area Zw includes a UTOC area Zut in which the user can freely record data indicating disc attribute and other areas forming a second program area Zp2.

The auxiliary storage apparatus 1 makes an access of an information signal on these optical discs 2 (2A, 2B and 2C) at the physical sector unit (2336 bytes in this embodiment).

Figure 3:
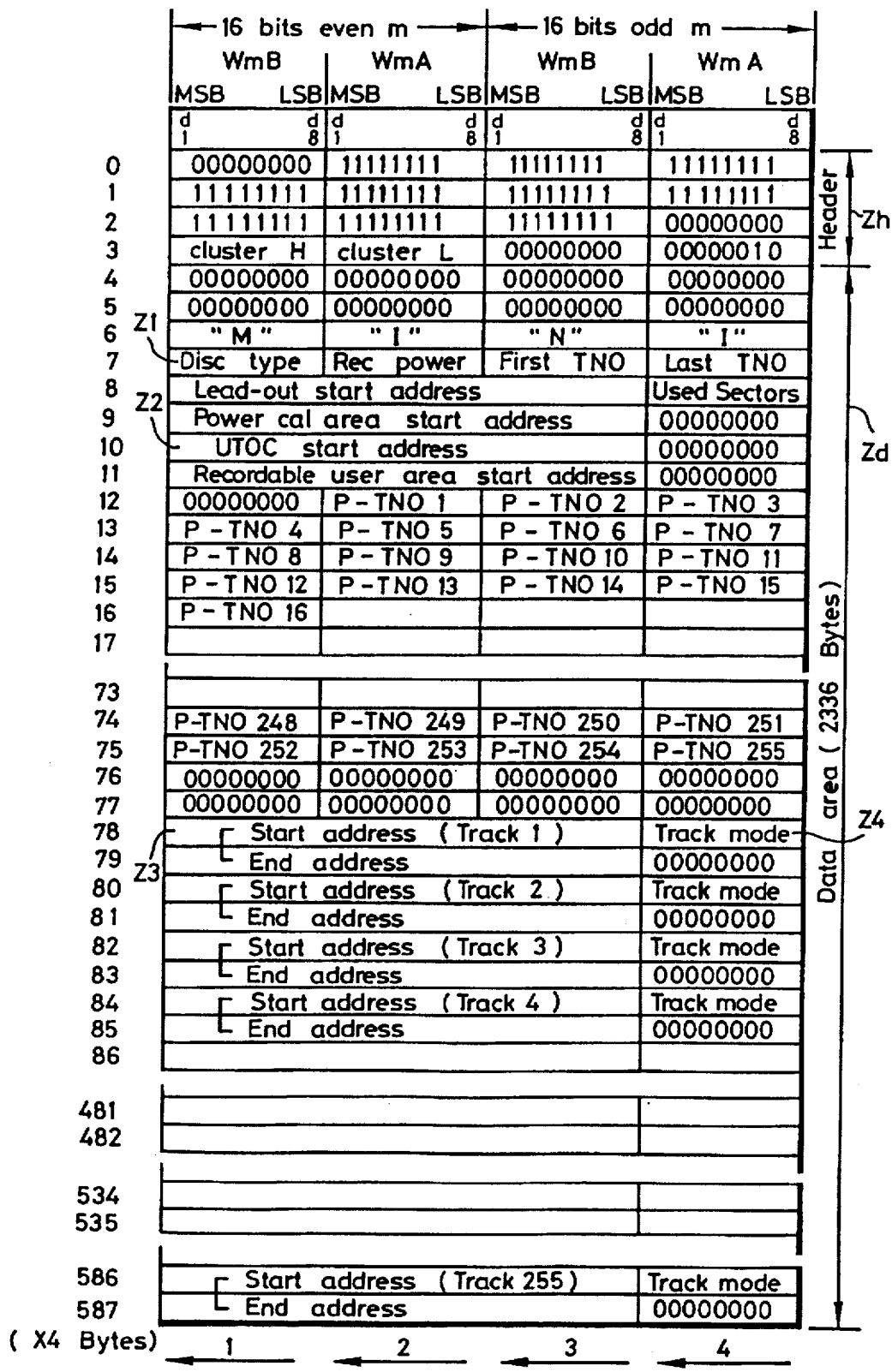
FIG. 3 is a diagram used to explain contents of bit allocation of TOC data recorded in the optical disc.

The TOC data recorded on the optical discs 2 is determined by the standardization. A data format of TOC data described in the Rainbow Book has, as shown in FIG. 3, a whole size of 2352 bytes. The first 16 bytes are allocated to a header Zh and the following 2336 bytes are allocated to a data area Zd.

The header Zh is composed of sync patterns of 12 bytes for achieving access synchronization, cluster sector addresses of 3 bytes and information of last 1 byte for indicating the disc type.

When the last 1 byte of the header Zh indicates that the optical disc is of the type with a diameter of 64 mm, to the data area Zd are allocated a disc type area Z1 in which a sub-divided classification concerning the optical disc, i.e., the disc types shown in FIGS. 2A, 2B and 2C (any one of read-only optical disc, recordable optical disc and hybrid optical disc) is registered, a UTOC address area Z2 in which s start address of UTOC data is stored, if the content of the disc type area Z1 indicates the recordable or hybrid optical disc, a track address area Z3 in which start and end addresses of each track are stored, and a track mode area Z4 in which track mode of each track is stored.

Figure 4:
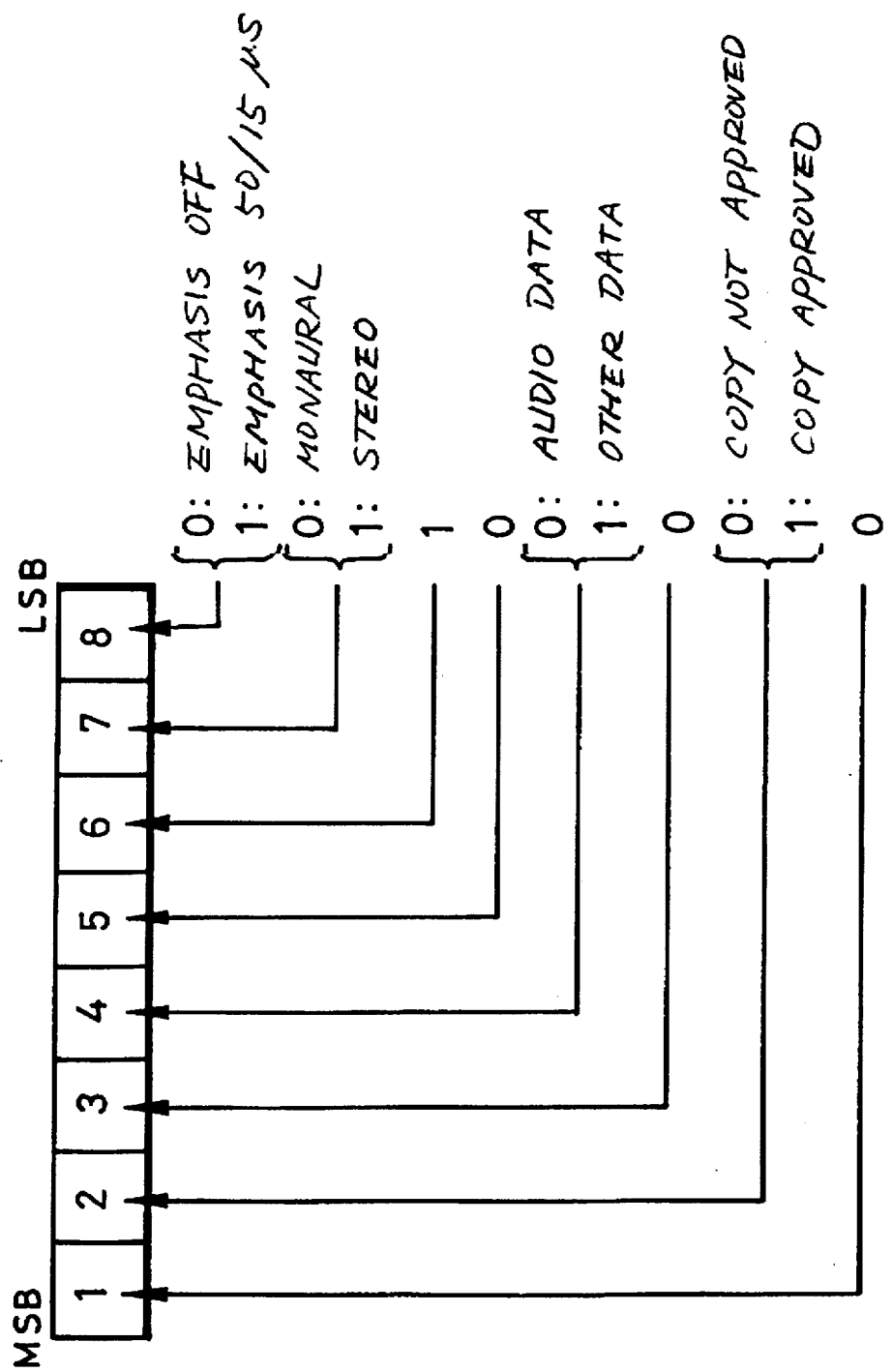
FIG. 4 is a diagram used to explain contents of bit configuration of track mode in TOC data.

As shown in FIG. 4, the track mode in the TOC data is composed of one byte each composed of first and third bits d1 and d3 assigned to spare bits in which fixed bits "0" are registered, a second bit d2 serving as a bit for determining whether or not copy (duplicate) is approved wherein "0" indicates that copy is not approved and "1" indicates that copy is approved and a fourth bit d4 used as a bit for determining whether or not audio data is recorded in the corresponding track or other data (e.g., computer data) is recorded in the corresponding track. The logic low "0" level of the fourth bit d4 indicates audio data and the logic high "1" level thereof indicates other data. On the fifth and sixth bits d5, d6 are registered fixed "0" and "1" respectively.

If the fourth bit d4 is logic low "0", indicating that there is audio data on the disk, then the seventh bit d7 is used as a bit for determining whether audio data is monaural or stereo if the fourth bit d4 is at logic low "0" level indicating the-audio data. The logic low "0" level of the seventh bit d7 indicates monaural audio data and the logic high "1" level indicates stereo audio data. When the fourth bit d4 is at logic low "0" level indicating audio data, then The last bit d8 is a bit for determining whether preemphasis is OFF or emphasis is 50/15 µs.

When the 4th bit d4 is at logic high "1" level indicating other data 7th and 8th bits d7, d8 indicate the access sector size is 512 bytes if they are "00". Further, if they are "01", the 7th and 8th bits d7, d8 indicate, that the access sector size is 1024 bytes and if they are "10", indicate that access sector size is 2048 bytes.

Figure 6:
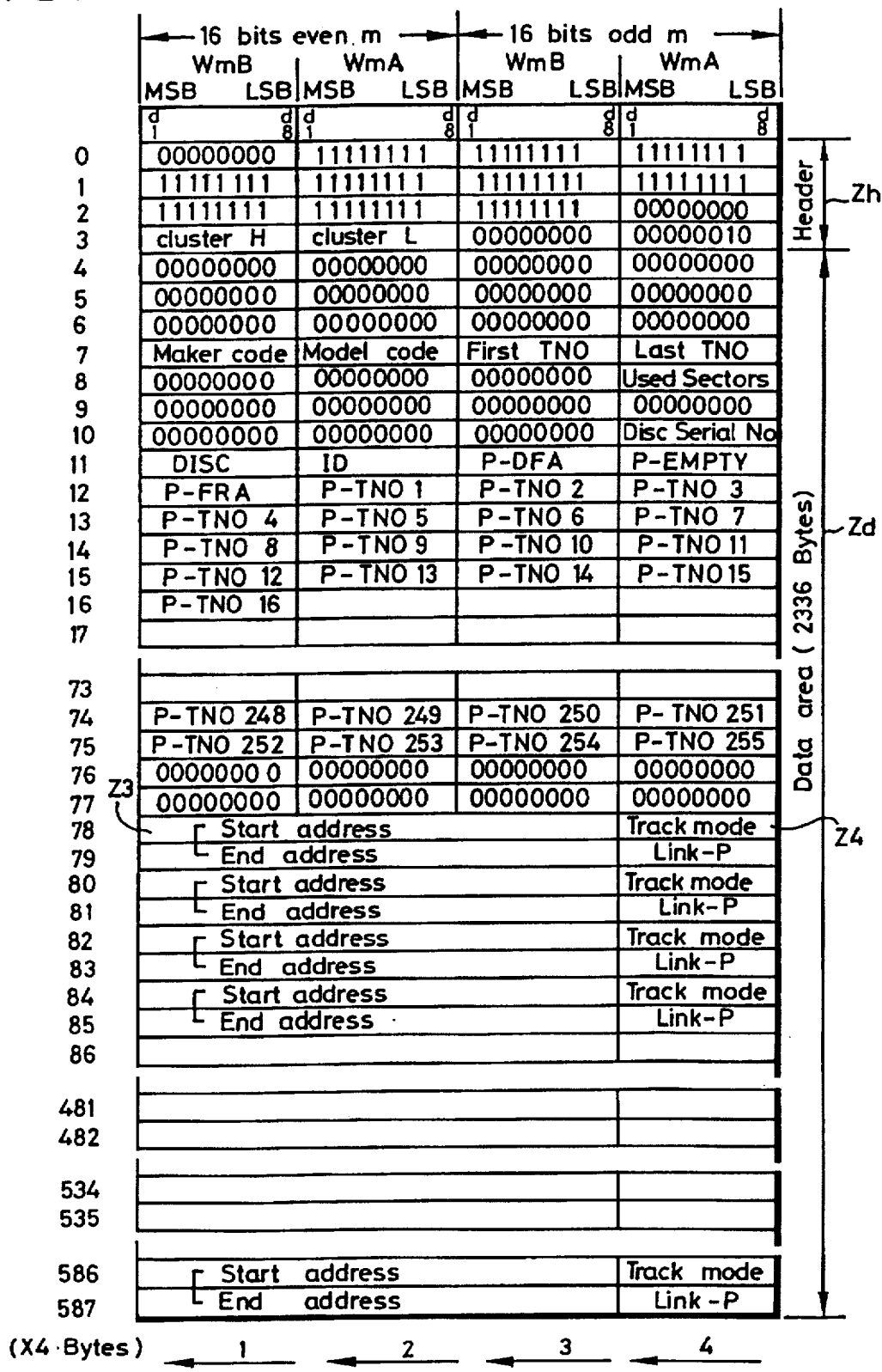
FIG. 6 is a diagram used to explain contents of bit allocation of UTOC data recorded on the optical disc.

The UTOC data recorded on the optical disc 1 also is determined by the standardization. The data format of UTOC data described in the Rainbow Book has, as shown in FIG. 6, a whole size of 2352 bytes. First 16 bytes are allocated to the header Zh and the following 2336 bytes are allocated to the data area Zd, similarly to the TOC data.

Similarly to the TOC data, the header Zh is composed of sync patterns of 12 bytes for achieving access synchronization, cluster sector addresses of 3 bytes and information of last 1 byte for indicating the disc type.

Figure 5:
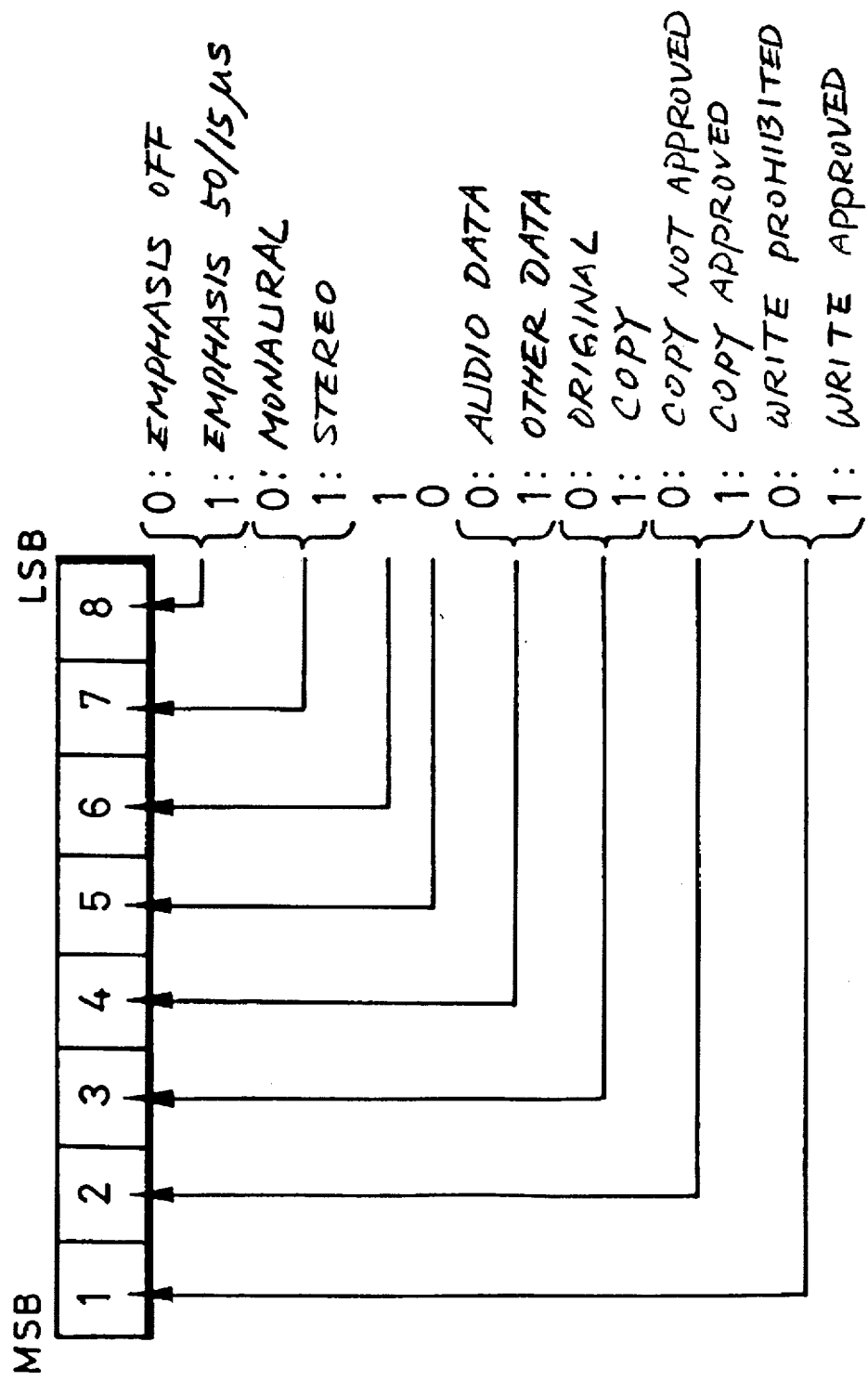
FIG. 5 is a diagram used to explain contents of bit configuration of track mode in UTOC data.

To the data area Zd are allocated a track address area Z3 in which at least the start address and the end address of each track are stored and a track mode area Z4 in which track mode of each track is stored. The track mode in the UTOC data is composed of 1 byte each as shown in FIG. 5. The start bit d1 is used to determine whether or not writing is approved. If start bit d1 is at logic low "0" level, then writing is not approved. If on the other hand the start bit d1 is at logic high "1" level, the writing is approved. The second bit d2 determine whether or not duplication is approved. If the second bit d2 is at logic low "0" level, then duplication is not approved. If on the other hand, the second bit d2 is at logic high "1" level, duplication is approved. The third bit d3 is used to determine whether the data recorded on the recordable area is original or copy data. If the third bit d3 is at logic low "0" level, then the data is original data. If, on the other hand the third bit d3 is at logic high "1" level, then the data is copy data.

The 4th bit d4 and the following bits are the same as those of the TOC data and therefore need not be described herein.

The inventive auxiliary storage apparatus 1 is connected to a computer 11 through an interface bus (e.g., SCSI bus) 12 as shown in FIG. 1. The computer 11 comprises a main storage apparatus 13 in which various program instructions and data are stored, a CPU (control device and logical unit) 15 for reading out the program instructions stored in the main storage apparatus 13 through a main storage control device 14 and executing the program instructions, an input/output (I/O) control device 16 for setting transmission and reception orders of data to various input and output devices connected to the outside and transfer standby instructions or the like and controlling the input and output of data, and a ROM 17 in which fixed data and program are registered previously. The interface bus 12 is connected through the input and output control device 16 to a data bus 18 provided within the computer 11. The input and output control device 16 is connected with various kinds of input and output apparatus, such as a printer 20, a display apparatus 21 and a keyboard 22 through another interface bus 19.

The computer 11 executes a particular sequence program so as to operate various operating systems (OS) when the computer 11 is energized. This sequence program is stored in the ROM 17, for example. Each time the program instruction is executed, data concerning the system is read out from the ROM 17 and the bootstrap program is read out from the auxiliary storage apparatus 1, thereby various operating systems being read out.

Figure 7:
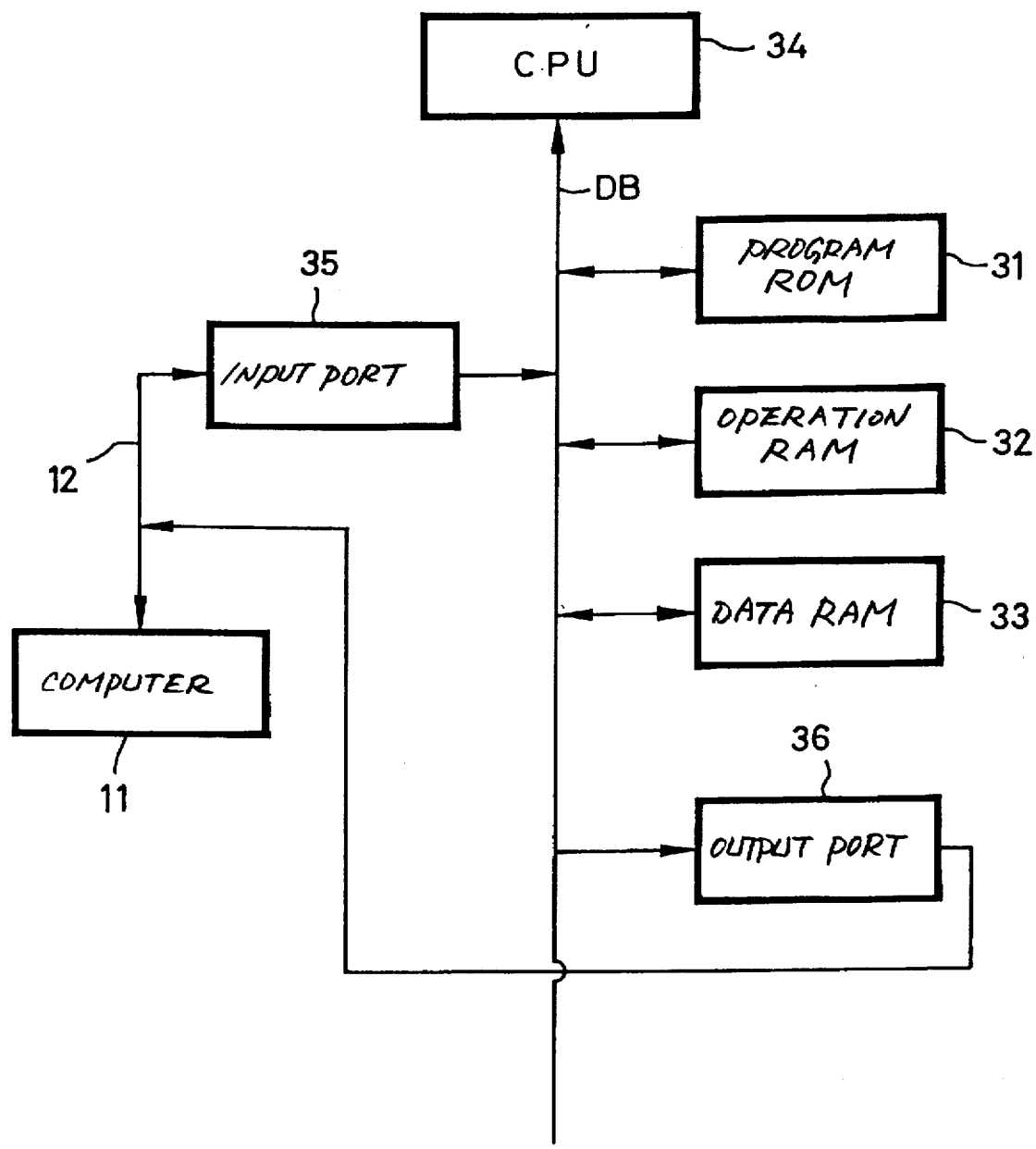
FIG. 7 is a block diagram showing a hardware arrangement of a system controller provided in the auxiliary storage apparatus.

The interface bus 12 from the computer 11 is connected to the system controller (not shown) provided within the auxiliary storage apparatus 1. As shown in FIG. 7, the system controller comprises a program ROM 31 in which various programs are stored, an operation RAM 32 used to operate the program read out from the program ROM 31, a data RAM 33 in which reproduced data from the optical disc, recorded data from the computer 11 and data processed data are stored, and a CPU (control device and logical unit) 34 for controlling the above-mentioned circuits.

The above-mentioned various circuits receive and transmit data through a data bus DB led out from the CPU 34 and controlled under the control of the CPU 34 through a control bus (not shown) led out from the CPU 34.

Data input from the computer 11 through the interface bus 12 is supplied to the data bus DB through an input port 35. Also, data stored in the data RAM 33 is supplied through an output port 36 and the interface bus 12 to the computer 11.

Processing operations of the auxiliary storage apparatus 1 and the computer 11, particularly, processing operations of the auxiliary storage apparatus 1 and the computer 11 when they are energized will be described below with reference to a functional block diagram of FIG. 8 and flowcharts of FIGS. 9 to 11.

In the computer 11, at the same time when the computer 11 is energized, initial operation, i.e., system check, memory check, setup within the computer 11 are carried out at step S1. Then, the processing proceeds to step S2, whereat data concerning the system and the sequence program used to read out the bootstrap program are read out from the ROM 17 and supplied through the memory control device 14 to the main storage apparatus 13, whereafter the sequence program is executed at step S3.

The processing proceeds to the next step S4, whereat the sequence program issues the bootstrap program read-out request to the auxiliary storage apparatus 1. It is determined in the next decision step S5 whether or not the bootstrap read-out request from the auxiliary storage apparatus 1 is transferred. This decision is carried out based on a state flag indicative of the end of transfer. The decision step S5 is repeated until the transfer of the bootstrap read-out request is ended.

Processing operation of the auxiliary storage apparatus 1 will be described with reference to the functional block diagram of FIG. 8 and the flowcharts of FIGS. 10 and 11.

Figure 10:
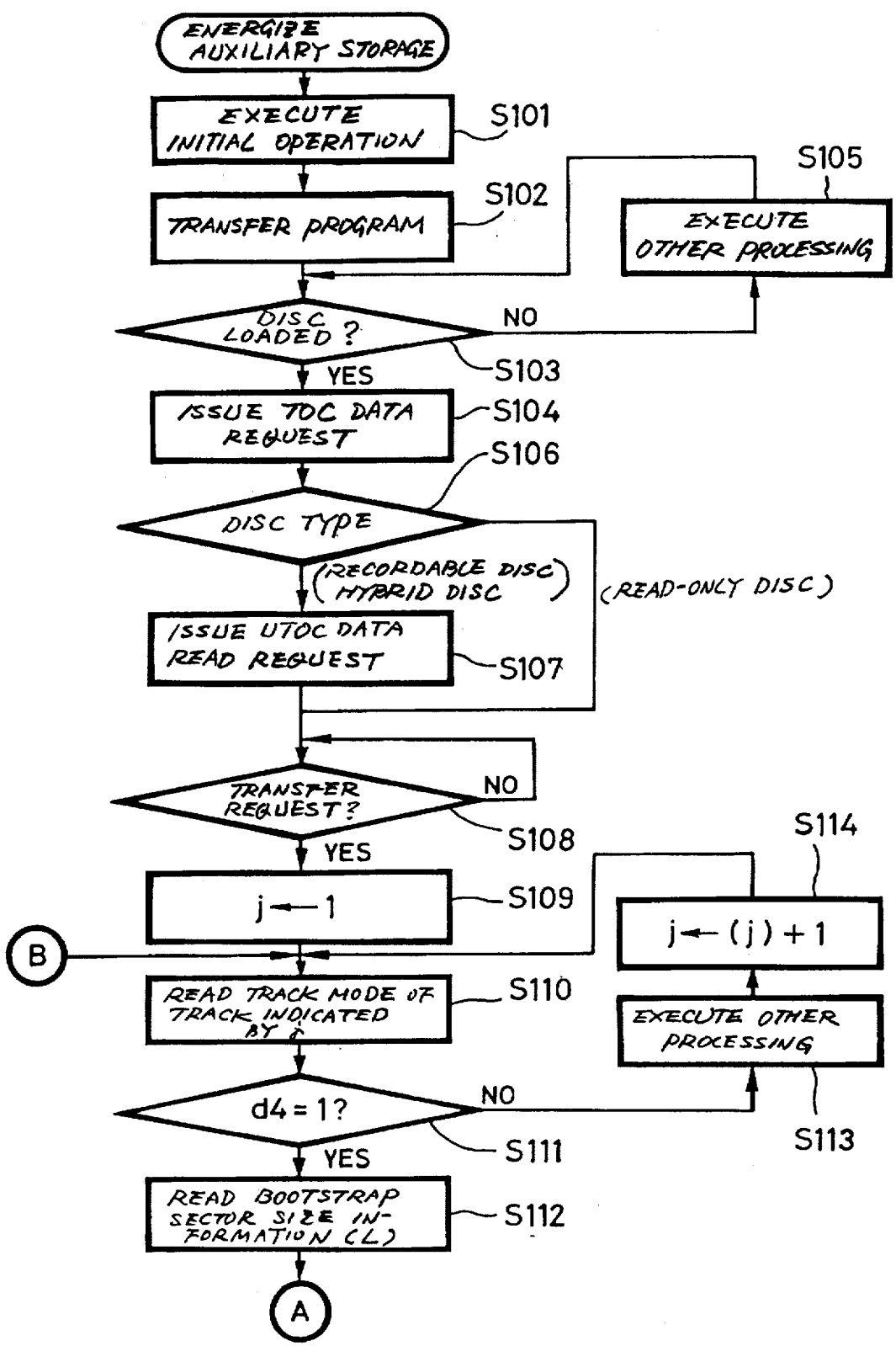
FIGS. 10 and 11 are respectively flowcharts to which reference will be made in explaining initial operation of the auxiliary storage apparatus when the auxiliary storage apparatus is energized.

Referring to FIG. 10, at the same time the auxiliary storage apparatus 1 is energized, processing proceeds to step S101, whereat initial operation, i.e., system check, memory check and setup within the auxiliary storage apparatus 1 are carried out.

The processing proceeds to the next step S102, whereat initial transfer program serving as means 41 (see FIG. 8) for transferring the bootstrap program from the program ROM 31 and a system control program serving as system control means 43 (see FIG. 8) used to access data through a servo control and recording/reproducing head 42 (see FIG. 8) are read out and written in the operation RAM 32. Also, work areas used as an area for temporarily saving data generated when the program is operated and an area used to receive and transmit parameters between the routines forming the program are allocated to the operation RAM 32.

A signal reproduced by the recording/reproducing head 42 is amplified by an RF amplifier (not shown), demodulated to digital data by a demodulating circuit (not shown), encoded in a proper manner, such as an error correction or the like and then stored in the data RAM 33 as reproduced data. In the auxiliary storage apparatus 1, data size per physical sector is formed of 2336 bytes. Further, in order that accessed data becomes easier to handle by the computer 11, the 2336 bytes are divided into 2048 bytes and 288 bytes for providing error correction and error detection codes so that the auxiliary storage apparatus 1 and the computer 11 can handle 1 sector=2048 bytes. Thus, the auxiliary storage apparatus 11 can function as an auxiliary storage apparatus of the computer 11.

Figure 8:
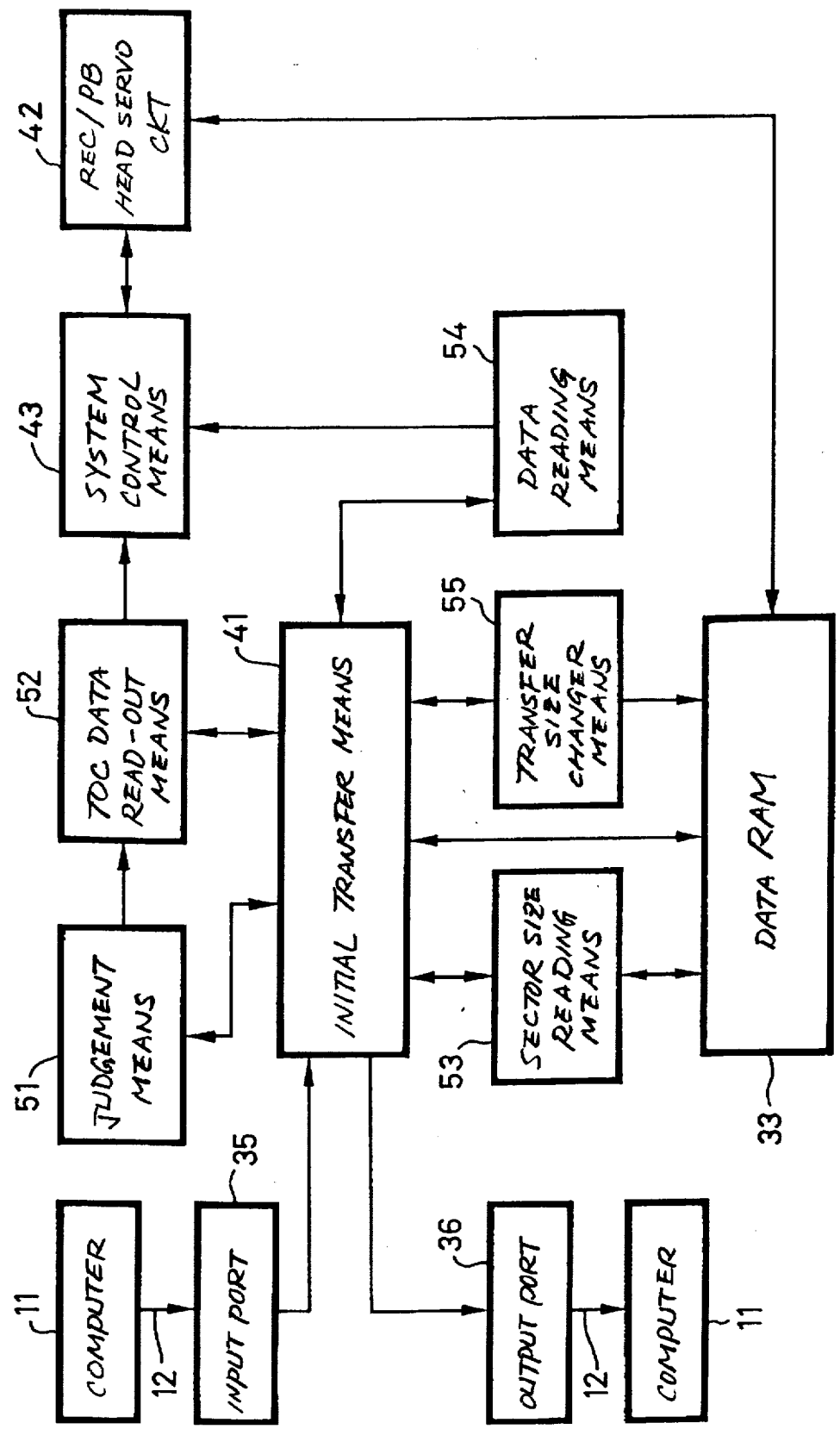
FIG. 8 is a functional block diagram showing initial operation of the auxiliary storage apparatus.

The initial transfer program 41 read out to the operation RAM 32 is comprised of, as shown in FIG. 8, determining means 51 for effecting various determinations, TOC data reading means 52 for issuing TOC data and UTOC data read request to the system control program 43 on the basis of the determined result from the determining means 51, sector size reading means 53 for reading out information representing sector size of bootstrap program (referred to hereinafter as "bootstrap sector size for the sake of simplicity) from the track mode of the TOC data (or UTOC data) thus read out, data reading means 54 for outputting track data reproduction request to the system control program 43, and transfer size changing means 55 for rewriting information that is stored in the system area of the operation RAM 32 so as to represent transfer sector size of the computer 11.

In the initial transfer program 41, it is determined in decision step S103 whether or not the optical disc 2 is currently loaded on the computer 11. This determination is carried out on the basis of input of a detected signal supplied thereto from a mechanical disc loading detection switch or the like. If the optical disc 2 is loaded on the computer 11 as represented by a YES at decision step S103, then the processing proceeds to the next step S104. If the optical disc 2 is not loaded onto the computer 11 as represented by a NO at decision step S103, then the processing proceeds to step S105, wherein other processing is carried out. Then, the processing returns to decision step S103 and the step S103 is repeated until the optical disc 2 is loaded onto the computer 11.

In the next step S104, TOC data request is issued by the TOC data read-out means 52. The system control program 43 controls the servo control circuit and various mechanism 42 on the basis of the read-out request from the TOC data read-out means 52 so that TOC data (data area of 2336 bytes) is read out from the optical disc 2 by the recording/reproducing head and supplied to the data RAM 33.

In the next decision step S106, the types of the optical disc 2 currently loaded on the computer 11 are determined by the determining means 51. The determination for this is carried out based on the contents stored in the disc type area Z1 of the TOC data shown in FIG. 3. Specifically, if the content stored in the disc type area Z1 is 3Dh="00111101", then it is determined that the disc is the read-only optical disc 2A; if the content is 3Eh="00111110", then it is determined that the disc is the recordable disc 2B; and if the content is 3Fh="00111111", then it is determined that the disc is the hybrid optical disc 2C.

If the determined result on the decision step S106 shows that the disc is the recordable optical disc 2B or the hybrid optical disc 2C, then the processing proceeds to step S107, whereat UTOC data read-out request is issued from the TOC data read-out means 52. The system control program 43 controls the servo control circuit and the various mechanisms 42 on the basis of the read-out request from the TOC data read-out means 52 and the address information registered on the UTOC address area Z2 of the TOC data so that the UTOC data (data area of 2336 bytes) is read out from the disc 2B or 2C by the recording/reproducing head and stored in the data RAM 33.

It is determined in the next decision step S108 whether or not the bootstrap program transfer request (i.e., loading command from LBA (0)) is issued from the computer 11. If the bootstrap program transfer request is issued from the computer 11 as represented by a YES at decision step S108, then the processing proceeds to the next step S109, whereat a track counter j is initialized, i.e., 1 is set to the counter j as the initial value.

Then, the processing proceeds to step S110, whereat track mode concerning a track indicated by the value in the track counter j is read out from the track modes obtained at every track registered in the TOC data or UTOC data by using the value in the track counter j as an index. It is determined by the determining means 51 in decision step S111 whether or not the value of the 4th bit d4 of the read-out track mode is "1", i.e., track is data concerning the computer data.

If the 4th bit d4 is "1" as represented by a YES at decision step S111, then the processing proceeds to step S112, whereat information of bootstrap sector size L is read out from the contents of the 7th bit and the final bit d8 of the read-out track mode by the sector size read-out means 53. In this embodiment, the bootstrap sector size L represents 512 bytes when the continuing data of the 7th and final bits are "00"; 1024 bytes when the continuing data are "01"; and 2048 bytes when the continuing data are "10".

If on the other hand the 4th bit d4 is "0", this is not directly related to the processing of this time and the processing therefore proceeds to step S113, wherein other processing is carried out. Then, the processing proceeds to the next step S114, whereat the value in the track counter j is updated by +1. Then, the processing returns to step S110 and the step S110 and the following steps are repeated.

Figure 11:
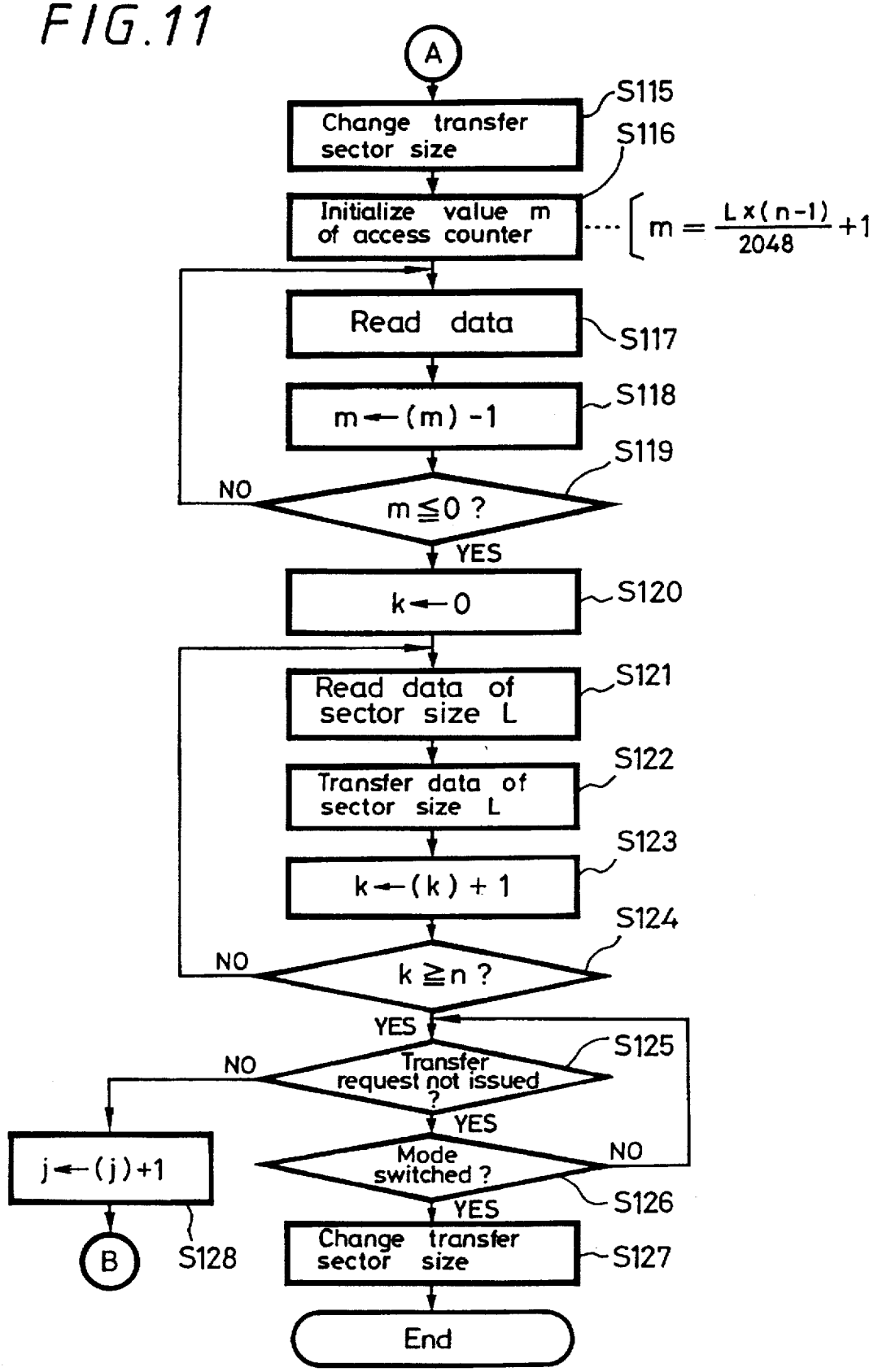

Referring to FIG. 11, in step S115, a sector size used to transfer data stored in the system area of the data RAM 33 to the computer 11 is changed by the transfer size changing means 55 to sector size shown by continuing data of the 7th and 8th bits. For example, if the bootstrap sector size is 512 bytes, then the transfer sector size to the computer 11 is changed to 512 bytes.

In the next step S116, an access counter m is initialized. A value of {L×(n−1)/2048}+1 is stored in the access counter m where n represents the number of blocks that are requested to be transferred from the computer 11.

In the next step S117, data read-out request in the corresponding track of the optical disc 2 is issued by the data read-out means 54. The system program controls the servo control circuit and the various mechanisms 42 on the basis of the read-out request from the data read-out means 54 and address information concerning the corresponding track from the track address area Z3 of the TOC data (or UTOC data) so that data (data of 2048 bytes) of the corresponding track is read out by the recording/reproducing head from the optical disc 2. The data thus read out is stored in the data RAM 33 at its predetermined area (referred to as "data storage area" for convenience).

Then, the processing proceeds to step S118, whereat the value of the access counter m is subtracted by "1" and updated. It is determined in the next decision step S119 by the determining means 51 whether or not the value of the access counter m is less than 0. Specifically, until the value of the access counter m becomes 0, the corresponding track is accessed sequentially at the physical sector unit (in this case, 2336 bytes) and the data thus read out is sequentially stored in the data storage area of the data RAM 33.

When the value of the access counter m becomes 0, the processing proceeds to step S120, wherein a block counter k is initialized. Then, the processing proceeds to step S121, wherein data is read out from the data storage area of the data RAM 33 at the transfer sector size L changed at step S115 by using the block counter k as an index. The processing proceeds to the next step S122, whereat the data thus read out of the transfer sector size is transferred to the computer 11 side.

In step S123, the value of the block counter k is added by "1" and thereby updated. The processing proceeds to the next decision step S124, wherein it is determined by the determining means 51 whether or not the value of the block counter k becomes the same as the request block number n supplied from the computer 11. Specifically, until the value of the block counter k becomes the request block number n, the data stored in the data storage area of the data RAM 33 is sequentially transferred at the block unit (in this case, the transfer sector size L unit). Thereafter, when the value of the block counter k becomes the same as the request block number n, the processing proceeds to the nest step S125.

The processing from step S112 to S124 will be described briefly. If it is determined in step S112 that the transfer sector size L is 512 bytes, then the access physical sector unit on the optical disc 2 is 2336 bytes and the normal transfer sector size is 2048 bytes. Therefore, when the request block number n from the computer 11 lies in a range of from 1 to 4 blocks, the access number in step S117 is one so that 2048-byte data is stored in the data storage area of the data RAM 33 regardless of the request block number n(=1 to 4). When the request block number n from the computer 11 falls in a range of from 5 to 8, the access number in step S117 becomes two so that 2048×2-byte data is stored in the data storage area of the data RAM 33 regardless of the request block number n(=5 to 8).

Similarly, if it is determined in step S112 that the transfer sector size L is 1024 bytes, when the request block number n from the computer 11 falls in a range of from 1 to 2 blocks, the access number in step S117 is one so that 2048-byte data is stored in the data storage area of the data RAM 33 regardless of the request block number n(=1 to 2). When the request block number n from the computer 11 falls in a range of from 3 to 4 blocks, the access number in step S117 becomes two so that 2048×2-byte data is stored in the data storage area of the data RAM 33 regardless of the request block number n(=3 to 4).

Similarly, if it is determined in step S112 that the transfer sector size L is 2048 bytes, the access number in step S117 becomes the same as the request block number n from the computer 11 with the result that (2048×request block number)-byte data is stored in the data storage area of the data RAM 33.

In steps S121 to S124, the data read out to the data storage area of the data RAM 33 in step S117 is divided at the block unit and data are respectively transferred to the computer 11 at the block unit. When the request block number n is equal to 1, transfer of data is finished by one data transfer.

It is determined in decision step S125 by the determining means 51 whether or not new transfer request is issued from the computer 11. This new transfer request is issued when the data transferred in step S122 is not related to the bootstrap program. If the new transfer request is not issued as represented by a YES at decision step S125, then it is determined that the above-mentioned decision by the computer 11 is not finished. Thus, the processing proceeds to the next decision step S126, whereat it is determined by the determining means 51 whether or not a mode switching request is issued from the computer 11.

If the mode switching request is issued from the computer 11 as represented by a YES at decisions step S126, then the processing proceeds to step S127. In step S127, the transfer sector size L to the computer 11 stored in the system area of the data RAM 33 is changed to the original transfer size (in this case, 2048 bytes) by the transfer size changing means 55. From this timing point, data access of the auxiliary storage apparatus 1 and the computer 11 is carried out at the unit of 2048 bytes.

The mode switching request is transmitted when the data transferred at step S122 is related to the bootstrap program. Thus, when the mode switching request is issued, the transfer request decision in step S125 is not carried out and the processing is ended. If on the other hand the mode switching request is not issued as represented by a NO at decision step S126, then this means that it is being determined by the computer 11 whether or not the data transferred in step S122 is related to the bootstrap program or that the decision is not yet carried out. Therefore, the processing returns to decision step S125, whereat it is determined by the determining means 51 whether or not the new transfer request is issued from the computer 11.

If it is determined in decision step S125 that the new transfer request is issued from the computer 11, then the processing proceeds to step S128, wherein the track counter j is added by "1" and updated. Then, the processing proceeds to step S110 and the step S110 and the following steps are repeated.

Figure 9:
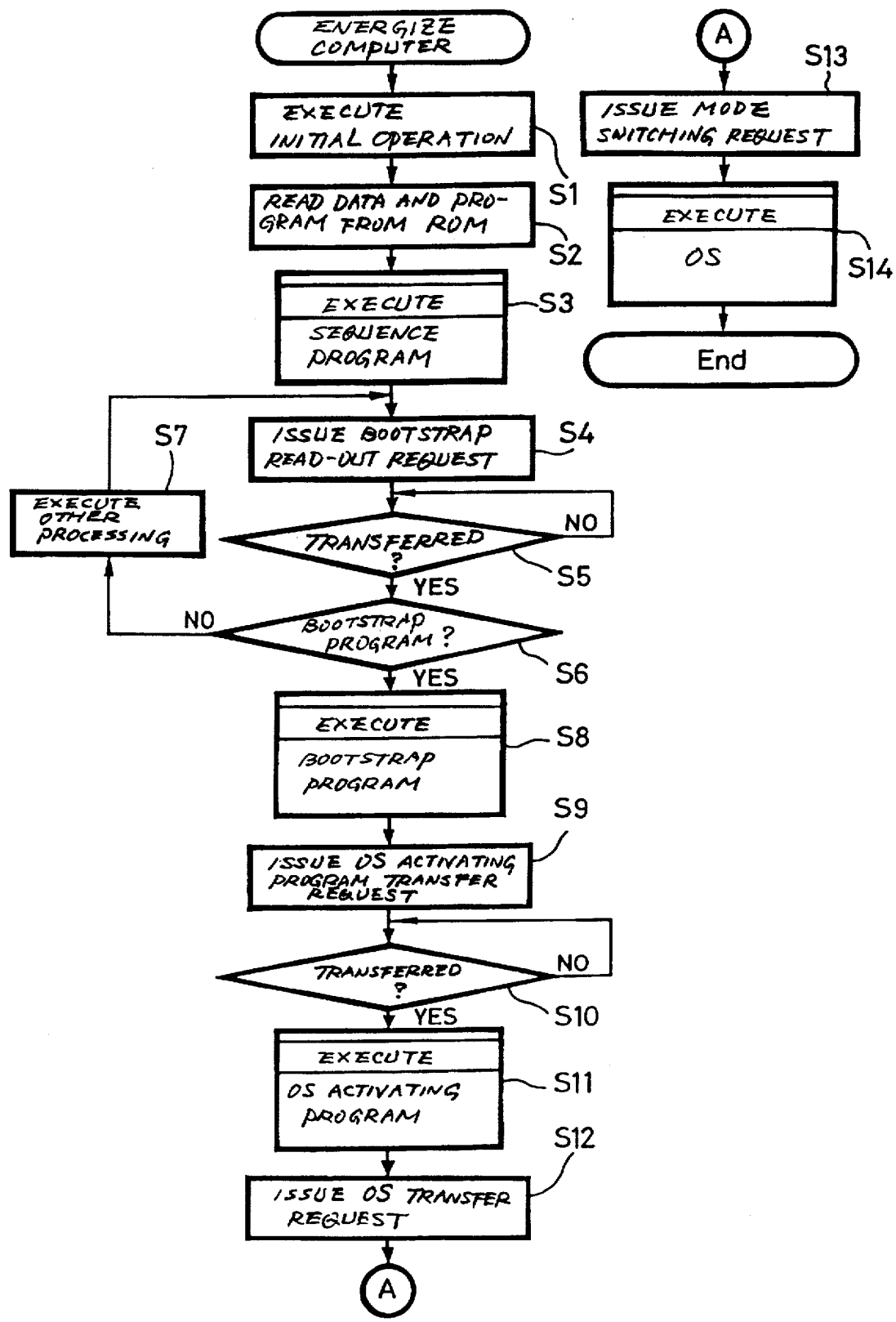
FIG. 9 is a flowchart to which reference will be made in explaining initial operation of the computer side when the computer is energized.

Referring back to the processing of the computer 11 in FIG. 9, it is determined in decision step S5 whether or not the data transfer is finished, i.e., if data from the auxiliary storage apparatus 1 is transferred to the predetermined area of the main storage 13 and the data transfer is finished. If the data transfer is finished as represented by a YES at decision step S5, then the processing proceeds to the next decision step S6. It is determined in decision step S6 whether or not the data transferred to the main storage 13 is related to the bootstrap program. In the bootstrap program, identification information (ID) is previously written in a predetermined area (e.g., 3-byte area from the start address and 3-byte area including the end address) of its particular address. Thus, it is determined in decision step S6 on the basis of the identification information written in the predetermined area of the particular address whether or not the data is related to the bootstrap program. If the identification information is the same as the identification information (ID) previously registered in a proper means, such as the ROM 17 or the like as represented by a YES at decision step S6, then the transferred data is the bootstrap program, and the processing proceeds to step S8.

If on the other hand the identification information is not identical to the identification information (ID) previously registered in the proper means, such as the ROM 17 or the like as represented by a NO at decision step S6, the transferred data is not the bootstrap program and the processing proceeds to step S7, whereat other processing is carried out. Then, the processing returns to step S4, whereat the new bootstrap program transfer request is issued and the step S5 and the following steps are repeated.

In step S8, the data transferred to the predetermined area of the main storage apparatus 1 is concerned with the bootstrap program. Thus, the particular address of the read out bootstrap program is accessed under the control of the CPU 15 and the bootstrap program is executed. When the bootstrap program is executed, this sequence program is ended.

In the next step S9, the bootstrap program requests the auxiliary storage apparatus 1 to transfer the OS activating program after the bootstrap program was activated. The auxiliary storage apparatus 1 reads out the OS activating program from the optical disc 2 in accordance with the OS activating program transfer request supplied thereto from the computer 1 on the basis of information, such as track address or the like inserted into the request information. Then, the auxiliary storage apparatus 1 transfers the OS activating program to the computer 11 side at the transfer size of 1 sector=512 bytes. The OS activating program thus transferred is stored in the memory, i.e., previously-set area of the main storage apparatus 13.

In the bootstrap program, it is determined in the next decision step S10 whether or not the transfer of the OS activating program is finished. If the transfer of the OS activating program is finished as represented by a YES at decision step S10, then the processing proceeds to step S11, wherein the OS activating program thus read out is executed and the processing is ended.

In the next step S12, the OS activating program requests the auxiliary storage apparatus 1 to transfer the OS on the basis of the OS transfer information previously registered in the main storage apparatus 13. The auxiliary storage apparatus 1 reads out the OS from the optical disc 2 in accordance with the OS transfer request supplied thereto from the computer 11 on the basis of the track address information inserted into the request information. Then, the auxiliary storage apparatus 1 transfers the OS selected by the transfer size of 1 sector=512 bytes to the computer 11 side. The OS thus transferred is stored in the memory area, i.e., previously-set area of the main storage apparatus 13.

Although the number of this transfer request is changed dependent on the scale of the OS, if it is determined that the transfer size is large, if transfer of several OS transfer requests is finished or if all OSs registered in the OS transfer information are transferred, the mode switching request is issued to the auxiliary storage apparatus 1 in step S13.

When the transfer of the OS is finished, the processing proceeds to step S14, whereat a particular address of the OS is controlled by the CPU 15 and the OS is executed. Then, a series of initial operations are ended.

As described above, according to the inventive auxiliary storage apparatus 1, data containing the bootstrap program stored in the optical disc 2 serving as the storage medium is read out at the normal physical sector unit (in this embodiment, 2336 bytes). The bootstrap program is extracted from the data thus read out in accordance with the information concerning the bootstrap sector size held in the particular area of the optical disc 2, and transferred to the computer 11 side. Specifically, the access of the information signal on the optical disc 2 is carried out at the normal physical sector unit (in this embodiment, 2336 bytes) and the bootstrap program is transferred to the computer 11 at the sector size (e.g., 512 bytes) allowed by the computer 11. Thus, the bootstrap program is transferred to the area of the predetermined memory size (e.g., 512 bytes) in which the particular address of the main storage apparatus 13 is used as the start address.

Therefore, even when the physical sector size (or the normal access sector size to the computer 11) which is the access unit in the auxiliary storage apparatus 1 and the bootstrap sector size L allowed by the computer 11 are different from each other, it is possible to prevent various data and program concerning the system larger than the predetermined memory size stored in the main storage apparatus 13 from being destroyed upon transferring the bootstrap program. Therefore, it is possible to avoid the disadvantage that the OS cannot be activated.

If the data whose amount is larger than the predetermined bootstrap sector size is transferred when the bootstrap program is transferred, the OS of the computer 11 of the system such that the bootstrap program is inhibited by the CPU 15 from being stored in the main storage 13 can be normally activated. The reason for this is as follows.

The sector size L of the transfer data is the same as the bootstrap sector size L so that the bootstrap program is not inhibited from being stored in the main storage apparatus 13.

Since the sector size of the data transfer carried out between the auxiliary storage apparatus 1 and the computer 11 is returned to the normal sector size (2048 bytes) of the auxiliary storage apparatus 1 after the bootstrap program was transferred, it is possible to increase the succeeding access speed. This is effective when the normal sector size is larger than the bootstrap sector size L.

While the mode switching request is issued in step S13 of FIG. 9 and the transfer sector size (e.g., 512 bytes) is returned to the normal sector size (e.g., 2048 bytes) when the mode switching request is issued in steps S126 and S127 in the flowchart of FIG. 11 as described above, these steps S13, S126 and S127 are not always necessary and may be omitted. In this case, the sector size of the data transfer carried out between the auxiliary storage apparatus 1 and the computer 11 after the bootstrap program was transferred might be the bootstrap sector size. In this case, when the normal sector size is smaller than the bootstrap sector size, this is advantageous in increasing the access speed.

Figure 12:
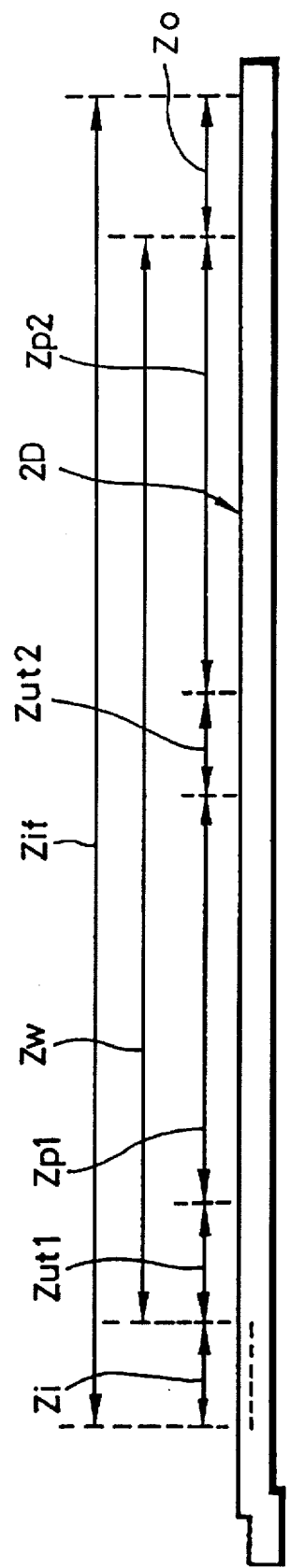
FIG. 12 is a cross-sectional view showing a right-hand half portion of another example of the optical disc used as the storage medium of the inventive auxiliary storage apparatus.

While the recording format of the recordable optical disc 2B (shown in FIG. 2B) serving as the optical disc 2 rotatably accommodated within the auxiliary storage apparatus 1 is arranged such that the TOC data is disposed in the leadin area Z1 provided at the innermost peripheral side of the information area Zif and one UTOC data is disposed in the inner peripheral side (area adjoining the leadin area Zi) of the recordable area Zw as described above, the present invention is not limited thereto and the following variant also is possible. As shown in FIG. 12, it is possible to use an optical disc 2D in which there are provided a plurality of (e.g., two) UTOC areas in which UTOC data is recorded. Also the program area Zp is divided into a plurality of areas. Similarly to the optical disc 2B shown in FIG. 2B, one UTOC area Zut1 is provided on the inner peripheral side of the recordable area Zw and the other UTOC area Zut2 is provided at substantially the central portion of the diameter direction of the recordable area Zw.

In this case, data and program based on a first OS, for example, are recorded on the first program area Zp1 managed by UTOC data in one UTOC area Zut1. Data and program based on a second OS, for example, are recorded on the second program area Zp2 managed by UTOC data in the other UTOC area Zut2. The first and second OSs are different in data row arrangement so that the first OS cannot activate the program concerning the second OS and cannot refer to data.

If the transfer processing program of the auxiliary storage apparatus 1 is added with a routine (determining and transfer means) which can transfer a bootstrap program corresponding to the OS of the computer 11, then it becomes possible to transfer the bootstrap program of the OS used by the computer 11 to the computer 11 when the computer 11 is activated.

Specifically, when the computer 11 is energized, data indicating types of OS used in accordance with the bootstrap program transfer request is transmitted from the computer 11. The auxiliary storage apparatus 11 enters the transfer routine of the bootstrap program of the transfer processing program in accordance with the transfer request from the computer 11 and determines on the basis of the OS type data which UTOC data should be referred to. Then, the auxiliary storage apparatus 1 transfers the bootstrap program of the OS indicated by the type data at the bootstrap sector size allowed by the computer 11.

With the above-mentioned arrangement, the auxiliary storage apparatus 1 can be connected to the computer 11 activated by other OS (e.g., second OS), thereby realizing the auxiliary storage apparatus 1 for general-purpose use.

While the optical disc 2 is used as the storage medium as described above, the present invention is not limited thereto and it is possible to use other magnetic disc and magnetic tape and other storage media, such as CD-ROM or the like.

As described above, according to the auxiliary storage apparatus of the present invention, there is provided the auxiliary storage apparatus connected through the interface bus to the computer to access data from the internal storage medium at the sector unit. Since the access size information concerning the bootstrap information held on the particular area of the storage medium is read out and the access sector size of the bootstrap information held on the storage medium is used as the sector size based on the access size information thus read out regardless of the normal access sector size, it is possible to normally activate the OS even when the access size of the auxiliary storage apparatus to the storage medium and the bootstrap sector size allowed by the computer are different from each other.

According to the present invention, since the auxiliary storage apparatus comprises the first data reading means for reading the access size information concerning the bootstrap information held on the particular area of the storage medium, the second data reading means for reading data containing the bootstrap information held in the storage medium in accordance with the normal access sector size and the data transfer means for extracting the bootstrap information from the data in accordance with the access sector size information read out by the first data reading means and transferring the bootstrap information thus extracted to the computer side, the access sector size of the bootstrap information held on the storage medium can be used as the sector size based on the access size information thus read out regardless of the normal access sector size. Therefore, it is possible to normally activate the OS even when the access size of the auxiliary storage apparatus to the storage medium and the bootstrap sector size are different from each other.

Furthermore, according to the auxiliary storage apparatus or the present invention, since the access sector size based on the access size information is made the same as the normal access sector size on the basis of the command from the computer, it is possible to increase the access speed after the bootstrap program was transferred.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An auxiliary storage apparatus connected through interface means to a computer to allow the computer to access data from a storage medium in said auxiliary storage apparatus, comprising:

a memory disposed between said interface means and said storage medium for temporarily storing data transmitted between said interface means and said access means, means for reading bootstrap sector size information from said storage medium, means for setting an access size for transmitting and receiving data between said computer and said auxiliary storage apparatus corresponding to said bootstrap sector size information, means for reading $(L \times (N-1)/2048)+1$ blocks of data of said access size from said storage medium to said memory, where L is said access size and N corresponds to a number of sectors requested by said computer, and means for reading N blocks of said data in said memory to said computer through said interface, said blocks being of said access size.

2. An auxiliary storage apparatus connected through interface means to a computer to allow the computer to access data from a storage medium in said auxiliary storage apparatus, said auxiliary storage apparatus comprising:

access means for accessing data in said storage medium of a specified access size;

a memory disposed between said interface means and said access means for temporarily accumulating data transmitted between said interface means and said access means; and control means for controlling said access means to read access size information recorded on said storage medium and to set said specified access size to a first size for transmitting and receiving data between said memory and said computer on the basis of the access size information.

3. Amended) An auxiliary storage apparatus according to claim 2 wherein said access size information is information representing a predetermined data access size for bootstrap information.

4. An auxiliary storage apparatus according to claim 3 wherein said control means changes said first access size set on the basis of said access size information to a predetermined second access size in response to a request signal supplied thereto from said computer when said computer activates a program based on said bootstrap information.

5. An auxiliary storage apparatus according to claim 4 wherein said control means comprises:

a counter the value of which is set to (L×(N−1)/2048)+1 wherein L is said data access size and N is a number of blocks that are requested to be transferred to the computer, and means for transferring requested data from said storage medium to said memory in blocks corresponding to said first size a number of times equal to the value loaded into said counter.

6. An auxiliary storage apparatus as set forth in claim 5 wherein said control means further comprises:

means for transferring said data in said memory means to said computer through said interface means after said requested data has been completely transferred to said memory.

7. An auxiliary storage apparatus as set forth in claim 6 wherein said means for transferring comprises:

means for transferring said requested data from said memory to said computer through said interface means in blocks of said access size.

8. A method of transferring data between a computer and an auxiliary storage apparatus connected to each other through an interface, said auxiliary storage apparatus accessing data from a storage medium in blocks of a specified access size, comprising the steps of:

reading access size information recorded on said storage medium;

setting said access size of transmitting and receiving data between said computer and said auxiliary storage apparatus to a first access size on the basis of said access information; and transmitting and receiving data between said computer and said auxiliary storage apparatus at said first access size.

9. A method according to claim 8 wherein said access size information is information representing a predetermined data access size for bootstrap information.

10. A computer system having a computer and an auxiliary storage apparatus connected through interface means to said computer to allow said computer to access data from a storage medium, said auxiliary storage apparatus comprising:

access means for accessing said storage medium in blocks of a specified access size;

a memory disposed between said interface means and said access means for temporarily accumulating data transmitted between said interface means and said access means; and control means for controlling said access means to read access size information recorded on a particular area of said storage medium and to set said access size for transmitting and receiving data between said memory and said computer to a first size on the basis of the access size information.

11. A computer system according to claim 10 wherein said access size information is information representing a predetermined data access size for bootstrap information.

12. A computer system according to claim 11 wherein said computer changes said first access size to a second access size in response to a request signal supplied thereto from said computer when said computer activates a program based on said bootstrap information.

* * * * *